US011940130B2

(12) United States Patent
Choi et al.

(10) Patent No.: US 11,940,130 B2
(45) Date of Patent: Mar. 26, 2024

(54) LIGHTING DEVICE FOR SIMULATING THE SKY

(71) Applicant: Samsung Electronics Co., Ltd., Gyeonggi-do (KR)

(72) Inventors: Eunha Choi, Gyeonggi-do (KR); Jeonghan Song, Gyeonggi-do (KR); Keunbum Lee, Gyeonggi-do (KR); Seungjae Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 75 days.

(21) Appl. No.: 17/730,866

(22) Filed: Apr. 27, 2022

(65) Prior Publication Data

US 2023/0003366 A1 Jan. 5, 2023

Related U.S. Application Data

(63) Continuation of application No. PCT/KR2022/004306, filed on Mar. 28, 2022.

(30) Foreign Application Priority Data

Jul. 5, 2021 (KR) ........................ 10-2021-0088026

(51) Int. Cl.
*F21V 19/02* (2006.01)
*F21V 5/00* (2018.01)
(Continued)

(52) U.S. Cl.
CPC ................ *F21V 19/02* (2013.01); *F21V 5/00* (2013.01); *F21V 11/08* (2013.01); *F21V 17/02* (2013.01);
(Continued)

(58) Field of Classification Search
CPC .. F21V 19/002; F21V 19/003; F21V 19/0025; F21V 11/08; H01L 25/0756; H05B 35/00
See application file for complete search history.

(56) References Cited

U.S. PATENT DOCUMENTS

2012/0320579 A1* 12/2012 Ferguson ................ F21V 29/67 362/355
2014/0117877 A1 5/2014 Mapel et al.
(Continued)

FOREIGN PATENT DOCUMENTS

EP 2 235 431 6/2018
JP 2015-082474 4/2015
(Continued)

OTHER PUBLICATIONS

International Search Report dated Jul. 13, 2022 Issued in counterpart application No. PCT/KR2022/004306, 10 pages.

*Primary Examiner* — Eric T Eide
(74) *Attorney, Agent, or Firm* — The Farrell Law Firm, P.C.

(57) ABSTRACT

The present disclosure provides a lighting device including a first lighting unit including a plurality of first light sources arranged on a first flat or curved surface, and configured to implement lighting of a first illuminance and of a first color, a second lighting unit including a plurality of second light sources arranged on a second flat or curved surface at least partially inclined with respect to the first lighting unit, the second lighting unit surrounding at least a part of the first lighting unit, and configured to implement lighting of a second illuminance at least partially different from the first illuminance and of a second color, at least one opening formed to penetrate through the first lighting unit, and at least one third lighting unit including a plurality of third light sources arranged on a third flat or curved surface, and configured to implement lighting of a third illuminance higher than the first illuminance and of a third color through the opening. The second lighting unit may be configured to implement the lighting of the second illuminance and the second color in conjunction with the third lighting unit.

19 Claims, 13 Drawing Sheets

(51) Int. Cl.

| | |
|---|---|
| ***F21V 11/08*** | (2006.01) |
| ***F21V 17/02*** | (2006.01) |
| ***F21Y 105/10*** | (2016.01) |
| ***F21Y 113/10*** | (2016.01) |

(52) U.S. Cl.
CPC ....... *F21Y 2105/10* (2016.08); *F21Y 2113/10* (2016.08)

(56) References Cited

U.S. PATENT DOCUMENTS

| | | | | |
|---|---|---|---|---|
| 2014/0160719 | A1 | 6/2014 | Van Boven et al. | |
| 2015/0062892 | A1 | 3/2015 | Krames et al. | |
| 2016/0205744 | A1 | 7/2016 | Patel et al. | |
| 2017/0205051 | A1* | 7/2017 | Jørgensen | F21V 5/008 |
| 2018/0216791 | A1 | 8/2018 | Leung et al. | |
| 2018/0246270 | A1 | 8/2018 | Di Trapani et al. | |
| 2018/0279439 | A1 | 9/2018 | Takeshita et al. | |
| 2019/0285247 | A1 | 9/2019 | Usseglio Nanot et al. | |
| 2020/0003393 | A1 | 1/2020 | Takeshita | |
| 2021/0022223 | A1 | 1/2021 | Eisele et al. | |
| 2022/0341565 | A1* | 10/2022 | Rasmussen | F21S 10/00 |

FOREIGN PATENT DOCUMENTS

| | | |
|---|---|---|
| JP | 2018-191017 | 11/2018 |
| JP | 2019-114498 | 7/2019 |
| JP | 2019-212363 | 12/2019 |
| KR | 1020180048803 | 5/2018 |

* cited by examiner

LIGHTING DEVICE FOR SIMULATING THE SKY

CROSS-REFERENCE TO RELATED APPLICATION(S)

This application is a Bypass Continuation application of PCT International Application No. PCT/KR2022/004306, which was filed on Mar. 28, 2022, in the Korean Intellectual Property Office, and claims priority to Korean Patent Application No. 10-2021-0088026, which was filed on Jul. 5, 2021, in the Korean Intellectual Property Office, the content of each of which is incorporated herein by reference.

BACKGROUND

1. Field

The disclosure relates generally to a lighting device for providing lighting that simulates the sky or the sun.

2. Description of Related Art

As seasonal or environmental factors limit outdoor activities, more time may be spent indoors. The increased time spent indoors may limit meaningful effects achievable from sunlight, such as a sense of time or melatonin control. Accordingly, indoor lighting devices that simulate sunlight indoors have been attracting more attention. A lighting device simulating sunlight indoors may provide lighting, colors, or images (e.g., the sky or the sun) similar to an outdoor environment or actual weather by adjusting the color or illuminance of the lighting. It is possible to provide an environment in which a biorhythm may be maintained according to a timeline by providing light simulating sunlight indoors through such a lighting device.

However, even though it is possible to output light that simulates sunlight, there may be limitations in providing various user experiences beyond simply providing lighting. For example, after light sources are installed, areas radiated with light may be substantially fixed. Although current sky information may be implemented as lighting through control of the individual light sources, it may be substantially impossible to select a position of the sun and a radiation area according to a user-intended time or trajectory.

SUMMARY

The present disclosure has been made to address the above-mentioned problems and disadvantages, and to provide at least the advantages described below.

According to an aspect of the present disclosure, a lighting device includes a first lighting unit including a plurality of first light sources arranged on a first flat or curved surface, and configured to implement lighting of a first illuminance and of a first color, a second lighting unit including a plurality of second light sources arranged on a second flat or curved surface at least partially inclined with respect to the first lighting unit, the second lighting unit surrounding at least a part of the first lighting unit, and configured to implement lighting of a second illuminance at least partially different from the first illuminance and of a second color, at least one opening formed to penetrate through the first lighting unit, and at least one third lighting unit including a plurality of third light sources arranged on a third flat or curved surface, and configured to implement lighting of a third illuminance higher than the first illuminance and of a third color through the opening. The second lighting unit may be configured to implement the lighting of the second illuminance and the second color in conjunction with the third lighting unit.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
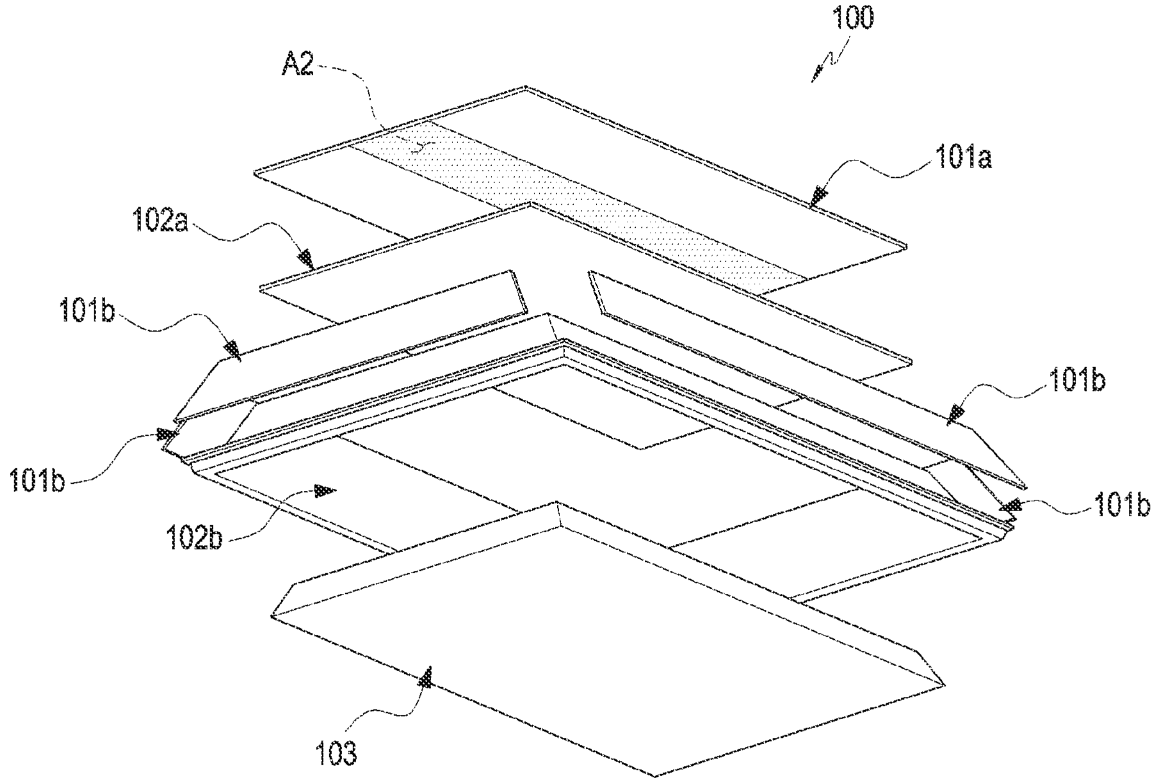
FIG. 1 is an exploded perspective view illustrating an electronic device or a lighting device, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The following description with reference to the accompanying drawings is provided to assist in a comprehensive understanding of various embodiments of the disclosure as defined by the claims. The description includes various specific details to assist in understanding but these details are to be regarded as merely exemplary. Accordingly, those skilled in the art will understand that various changes and modifications can be made to of the various embodiments described herein without departing from the scope and spirit of the disclosure. In addition, descriptions of well-known functions and constructions may be omitted for clarity and conciseness.

The terms and words used in the following description and claims are not limited to their dictionary meanings, but are merely used to enable a clear and consistent understanding of the disclosure. Accordingly, it should be apparent to those skilled in the art that the following description of various embodiments of the disclosure is provided for illustrative purposes only and not for the purpose of limiting the disclosure as defined by the appended claims.

It is to be understood that the singular forms, e.g., “a,” “an,” and “the”, include plural referents unless the context clearly dictates otherwise. Thus, for example, reference to “a component surface” includes reference to one or more component surfaces.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used herein, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (an internal memory or an external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments of the disclosure are devised to at least provide a lighting device that simulates the sky or sunlight.

Various embodiments of the disclosure may provide a lighting device that facilitates adjustment or selection of a position of the simulated sun or an area to which simulated sunlight is radiated.

An electronic device and/or a lighting device according to various embodiments of the disclosure may create an environment similar to an outdoor environment indoors by simulating the sky or sunlight by using various light sources having different specifications. In an embodiment, the electronic device and/or the lighting device may facilitate adjustment or selection of a position of the simulated sun or an area to be radiated with simulated sunlight. For example, solar effects such as biorhythm maintenance or melatonin control may be provided by simulating an outdoor environment indoors according to a timeline or weather changes. In addition, various effects recognized directly or indirectly from the disclosure may be provided.

FIG. 1 is an exploded perspective view illustrating an electronic device or a lighting device, according to an embodiment.

Referring to FIG. 1, the electronic device and/or lighting device 100 includes lighting units 101*a* and 101*b* (e.g., a first lighting unit 101*a* and a second lighting unit 101*b*), a cover plate 102*a*, a bracket 102*b*, and/or a diffusion plate 103. The lighting units 101*a*, 101*b* may be mounted on the cover plate 102*a* and/or the bracket 102*b*, and the cover plate 102*a* and/or the bracket 102*b* may protect the lighting units 101*a* and 101*b*. Each of the lighting units 101*a* and 101*b* may include a plurality of light sources 13, and output or radiate light of various colors/illuminances under the control of a controller (e.g., a processor). Each of the light sources 113 may include a light emitting diode or an organic light emitting diode and radiate light toward the outside or the diffusion plate 103. The electronic device and/or lighting device 100 may further include a third lighting unit that simulates the sky. At least a part of a first lighting unit 101*a* may implement lighting that simulates the sun.

The first lighting unit 101*a* and a second lighting unit 101*b* may be substantially identical in terms of configuration and different in terms of location or shape. For example, although the first lighting unit 101*a* is shown in FIG. 1 to be shaped into a flat plate on the whole, the first lighting unit 101*a* may be curved. The first lighting unit 101*a* may be located on the bracket 102*b* to provide downward lighting toward the diffusion plate 103. Although the second lighting unit 101*b* is shown to be shaped into a flat plate, the second lighting unit 101*b* may be curved. A plurality of second lighting units 101*b* may be arranged or disposed around the periphery of the bracket 102*b* and provide lighting toward the diffusion plate 103 in directions inclined with respect to the first lighting unit 101*a*. The first lighting unit 101*a* and the second lighting units 101*b* may differ in terms of light sources and their arrangement. As described with reference to FIGS. 2, 3 and 4, the lighting units 101*a* and 101*b* may include a plurality of light sources 113 arranged on a substrate 111, and the lights 113 may be arranged uniformly on the whole across the entire substrate 111. The first lighting unit 101*a* may simulate the sky and the sun. In this case, the light sources 113 may be arranged more densely in an area of the substrate 111 than in another area of the substrate 111 or may output light of a different wavelength in the former area than in the latter area.

At least one of the lighting units 101*a* and 101*b* may radiate light in colors simulating the sky by using a plurality of light sources 113. For example, the light sources 113 of the first lighting unit 101*a* may radiate light at a first illuminance in a first color to implement an illuminance or color that simulates the sky on the diffusion plate 103. An "illuminance or color" that simulates the sky may include an image of a cloud shape (or color) with a background of blue or red. The lighting device 100 may receive a current time or weather information through an external electronic device or a server and implement an illuminance or color that simulates the sky by using at least one of the lighting units 101*a* and 101*b*. The lighting device 100 may implement a color or color change that simulates the sky by radiating light onto the diffusion plate 103 by using at least one of the lighting units 101*a* and 101*b*.

The electronic device and/or lighting device 100 may radiate an illuminance or color that simulates the sun by some of the light sources 113 of the lighting units 101*a* and 101*b*. For example, light sources 113 arranged in some of the lighting units 101*a* and 101*b* (e.g., an area denoted by "A2") may have a different specification from that of the other area or may be arranged more densely than in the other area. The light sources 113 in the area denoted by "A2" may radiate light at a higher illuminance than the light sources 113 in the other area or in a different color from the light sources 113 in the other area, to simulate the sun. In addition, the electronic device and/or lighting device 100 may radiate light with an illuminance or color that simulates the sun by an additional lighting unit. In this manner, the electronic device and/or lighting device 100 may create an outdoor atmosphere in an indoor space. Additionally, the electronic device and/or lighting device 100 may be connected to another electronic device or a network to obtain information about a current time or weather and may simulate an image of a color or illuminance based on the obtained information.

When the electronic device and/or lighting device 100 simulates the sky and the sun by the diffusion plate 103, the electronic device and/or lighting device 100 may use the second lighting units 101*b* to simulate an image with another illuminance and color. For example, the first lighting unit 101*a* (or the diffusion plate 103) may implement a black or gray series color (e.g., a shadow) in a partial area around an edge or periphery thereof, and an image of an illuminance and color similar to the sky or the sun simulated on the diffusion plate 103 in the remaining area thereof. Lighting or an image implemented by the second lighting units 101*b* may be substantially identical in color and different in illuminance to and from the simulated sky implemented by the first lighting unit 101*a* or the simulated sun implemented by the first lighting unit 101*a* (or the simulated sun implemented by the third lighting unit). Lighting or an image implemented by the second lighting units 101*b* and the simulated sky or the simulated sun rendered as an image may be substantially identical in color and different from each other in illuminance. This will be described in more detail with reference to FIGS. 15, 16, 17, 18, and 19.

The cover plate 102*a* may be disposed on the bracket 102*b* and protect the lighting units 101*a* and 102*b*, including the light sources 113 of the first lighting unit 101*a*. The first lighting unit 101*a* may be disposed on the bracket 102*b*, with the light sources 113 facing the cover plate 102*a*. The cover plate 102*a* may be formed of a material (e.g., polymer or glass) that substantially transmits light, and light radiated from the first lighting unit 101*a* may pass through the cover plate 102*a* and be projected onto the diffusion plate 103.

The bracket 102*b* may be shaped into a frame providing inclined surfaces with respect to the first lighting unit 101*a* or the cover plate 102*a*, and the second lighting units 101*b* may be disposed on the inclined surfaces of the bracket 102*b*. The bracket 102*b* may be integrally formed with the cover plate 102*a*. The light sources 113 of the second lighting units 101*b* may be disposed to face the inclined surfaces of the bracket 102*b*, and in this case, the bracket 102*b* may be formed of a material that transmits light. Light radiated from the second lighting unit 101*b* may pass through the bracket 102*b* and be projected onto the diffusion plate 103. In addition, when the second lighting units 101*b* are disposed on the inclined surfaces of the bracket 102*b*, the light sources 113 of the second lighting units 101*b* may be arranged to directly face the diffusion plate 103.

The diffusion plate 103 may be disposed surrounded by the bracket 102*b*, and may include a plurality of diffusion beads therein. The diffusion beads may transmit, reflect, refract, or scatter light radiated from the lighting units 101*a* and 101*b* to the diffusion plate 103, thereby evenly distributing the light throughout the diffusion plate 103. The diffusion plate 103 may function as the cover plate 102*a* for protecting the light sources 113 of the first lighting unit 101*a*. Additionally, the cover plate 101*a* may be omitted, and the diffusion plate 103 may be disposed to directly face the light sources 113 of the first lighting unit 101*a*.

A specified gap (e.g., a first gap g1 in FIG. 9 or FIG. 10) may be formed between the diffusion plate 103 and the inner surfaces of the bracket 102*b*. The electronic device and/or lighting device 100 may be combined with another product such as an air conditioner, and the gap between the diffusion plate 103 and the bracket 102*b* may function as a passage for an air flow. When the electronic device and/or lighting device 100 is combined with another product such as an air conditioner, a specified gap may be formed between the second lighting unit 101*b* and the first lighting unit 101*a*, between the second lighting unit 101*b* and the diffusion plate 103, and/or between the bracket 102*b* and the cover plate 102*a*, to function as a passage for an air flow.

Figure 2:
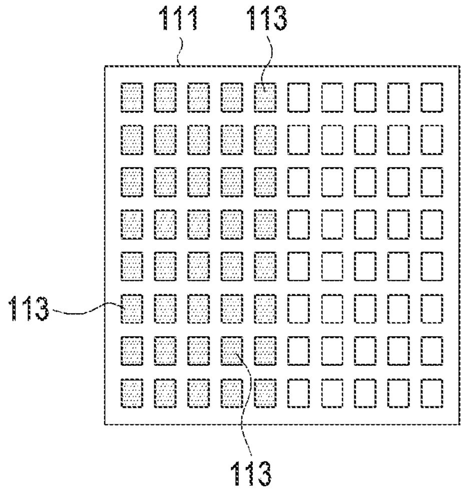
FIG. 2 is a plan view illustrating an array of light sources in an electronic device or a lighting device, according to an embodiment.
Figure 3:
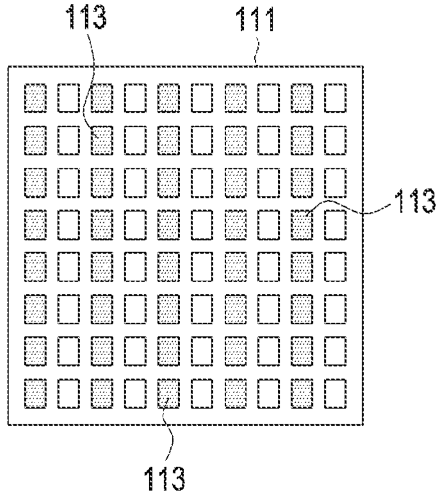
FIG. 3 is a plan view illustrating an array of light sources in an electronic device or a lighting device, according to an embodiment.
Figure 4:
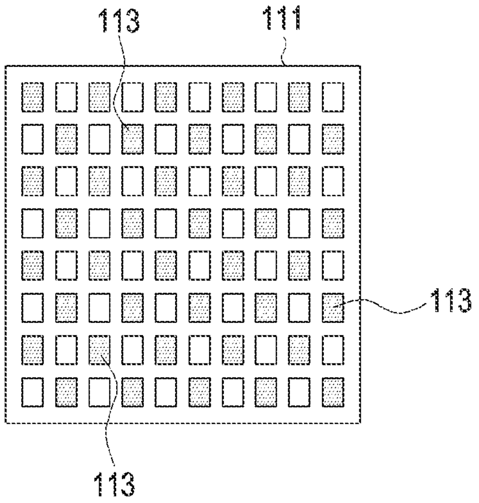
FIG. 4 is a plan view illustrating an array of light sources in an electronic device or a lighting device, according to an embodiment.

FIGS. 2-4 are plan views illustrating various arrays of light sources in an electronic device or a lighting device, according to various embodiments.

Referring further to FIGS. 2-4, the lighting units 101*a* and 101*b* include the substrate 111 and a plurality of light sources 113 arranged on the substrate 111. The light sources 113 may be arranged at predetermined intervals and positions on the substrate 111. For example, as illustrated in FIG. 2, the light sources 113 may be disposed in one area of the substrate 111, and an area without any light sources 113 may be provided in parallel to the area with the light sources 113. In addition, as illustrated in FIG. 3, the light sources 113 may be arranged in a plurality of columns (or rows), and a spacing between columns (or a spacing between rows) may be larger than the spacing between two adjacent light sources 113 in one column (or row). Additionally, as illustrated in FIG. 4, the light sources 113 may be arranged in a plurality of columns or rows, and the light sources 113 in two adjacent columns or two adjacent rows may be arranged in misalignment.

The light sources 113 may be irregularly arranged on the substrate 111. For example, an array of light sources 113 may be appropriately designed according to an image to be rendered on the diffusion plate 103, and the specification or arrangement of the light sources 113 may be determined in consideration of an illuminance or color to be implemented through the electronic device or lighting device 100.

According to an embodiment, when lighting simulating the sun is provided in a partial area of the first lighting unit 101*a*, for example, in the area denoted by "A2" in FIG. 1, the light sources arranged in the area denoted by "A2" may output light in a different wavelength from that of the light sources arranged in another area or may be arranged more densely than in another area.

Figure 5:
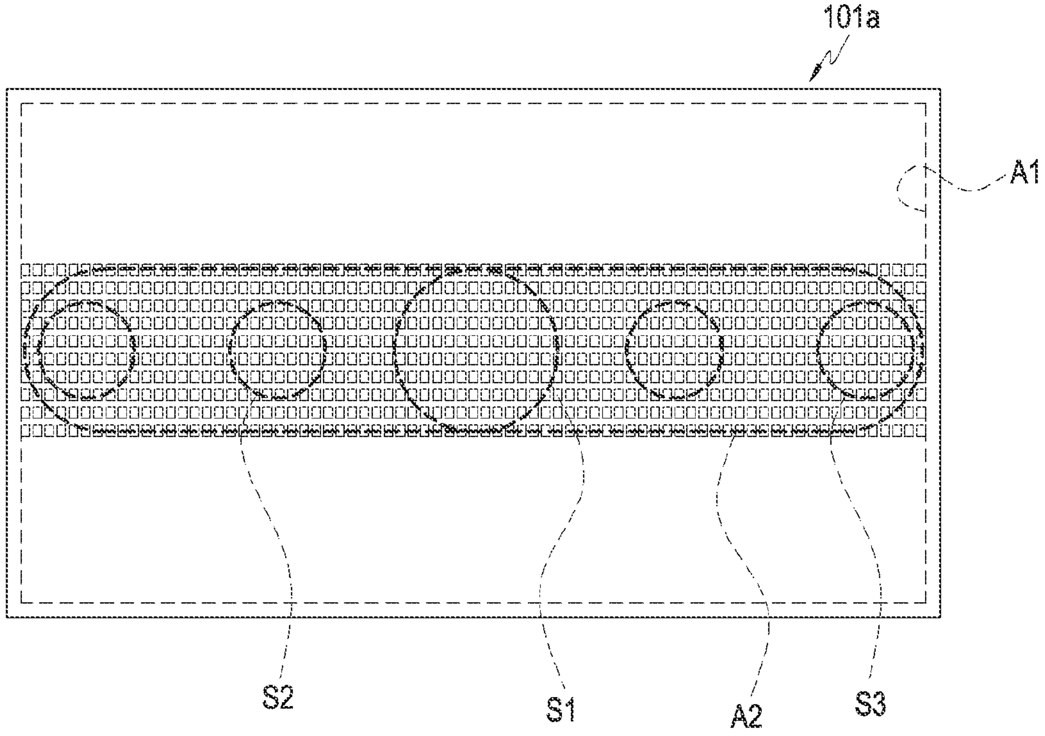
FIG. 5 is a diagram illustrating a lighting unit in an electronic device or a lighting device, according to an embodiment.

FIG. 5 is a diagram illustrating a lighting unit in an electronic device or a lighting device, according to an embodiment.

Referring to FIG. 5, the first lighting unit 101*a* includes a first light source area A1 that generates first lighting and a second light source area A2 that generates second lighting different from the first lighting. The second light source area A2 may be substantially a part of the first light source area A1. The first light source area A1 and/or the first lighting may provide lighting or an image that simulates the sky on the diffusion plate 103, and the second light source area A2 or the second lighting may provide lighting or an image that simulates the sun on the diffusion plate 103. First light sources for generating an image simulating the sky may be arranged in the first light source area A1, and second light sources for generating an image simulating the sun may be arranged in the second light source area A2. When the second light source area A2 is substantially a part of the first light source area A1, the second light sources may be arranged alternately with the first light sources. The second light sources are substantially the same as the first light sources, or light sources simulating the sun among the first light sources or the second light sources may emit light of a higher illuminance value than the other light sources.

For the sky simulation, at least some of the first light sources may be activated, and the sky may be simulated in various colors or at various illuminances on the diffusion plate 103 according to the number and positions of the activated first light sources or the outputs thereof. When the second light sources simulate the sun, the second light sources may be activated in a part of the second light source area A2, for example, in any one of areas denoted by reference numerals "S1", "S2" and "S3". In addition, some but not all of the second light sources may be selected and activated to simulate the sun. A position or area in which the sun is simulated on the diffusion plate 103 may vary according to a user setting or current time information received through an external electronic device or a network.

Figure 6:
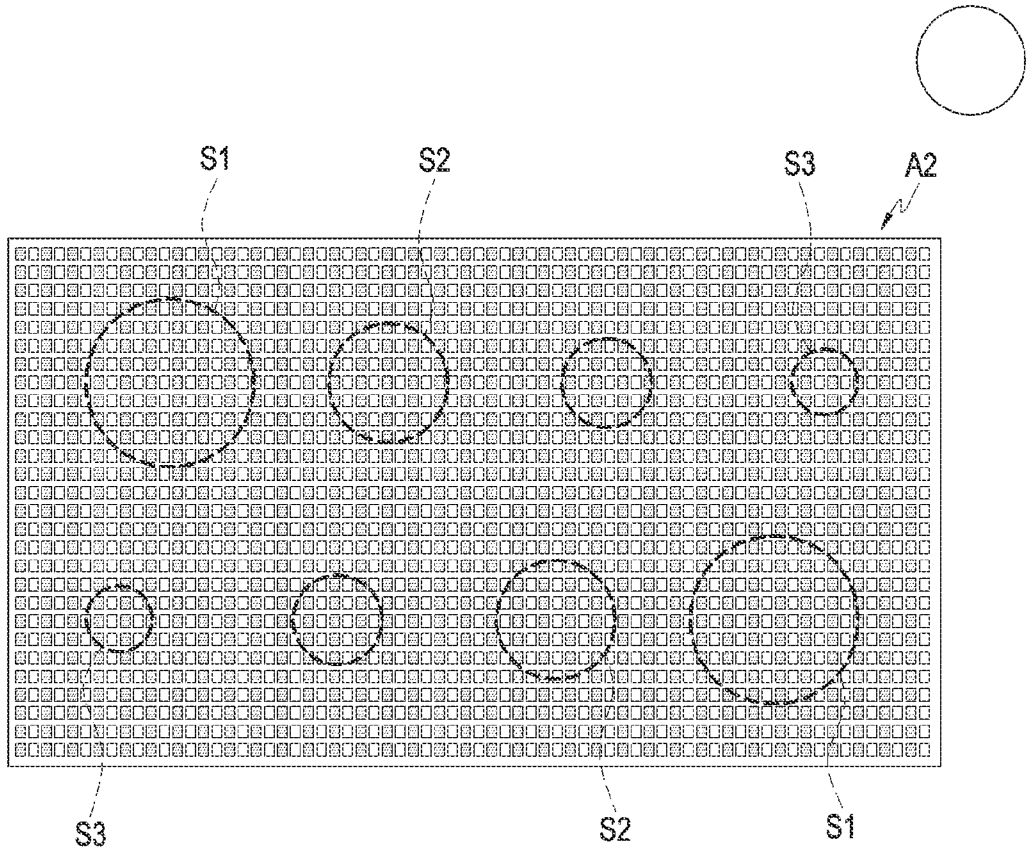
FIG. 6 is a diagram illustrating a light source area in a lighting unit of an electronic device or a lighting device, according to an embodiment.

FIG. 6 is a diagram illustrating a second light source area in a lighting unit of an electronic device or a lighting device, according to an embodiment.

Referring to FIG. 6, the second light sources may be arranged at different densities or may have different outputs (different illuminance values) in the second light source area A2, and a gradation effect may be applied by using the array of the second light sources. The area denoted by "S1" may simulate the sun at noon, and the area denoted by "S3" may simulate the sun in a time zone after sunrise or before sunset. The arrangement density or output of the second light sources may be smaller in the area denoted by "S2" than in the area denoted by "S1" and greater than in the area denoted by "S3". For example, for the same output, the second light sources may be more densely arranged in the area denoted by "S1" than in the area demoted by "S3".

Additionally, for the same density, the second light sources may have a higher output in the area denoted by "S1" than in the area denoted by "S3". In addition, the second light sources may be arranged more densely with a higher output in the area denoted by "S1" than in the area denoted by "S3". Also, the second light sources may be substantially equal in terms of an arrangement density or an arrangement periodicity through the second light source area A1, and the output of the second light sources may be controlled in the area denoted by "S1", "S2" and/or "S3" according to the intensity of an applied current or voltage.

Figure 7:
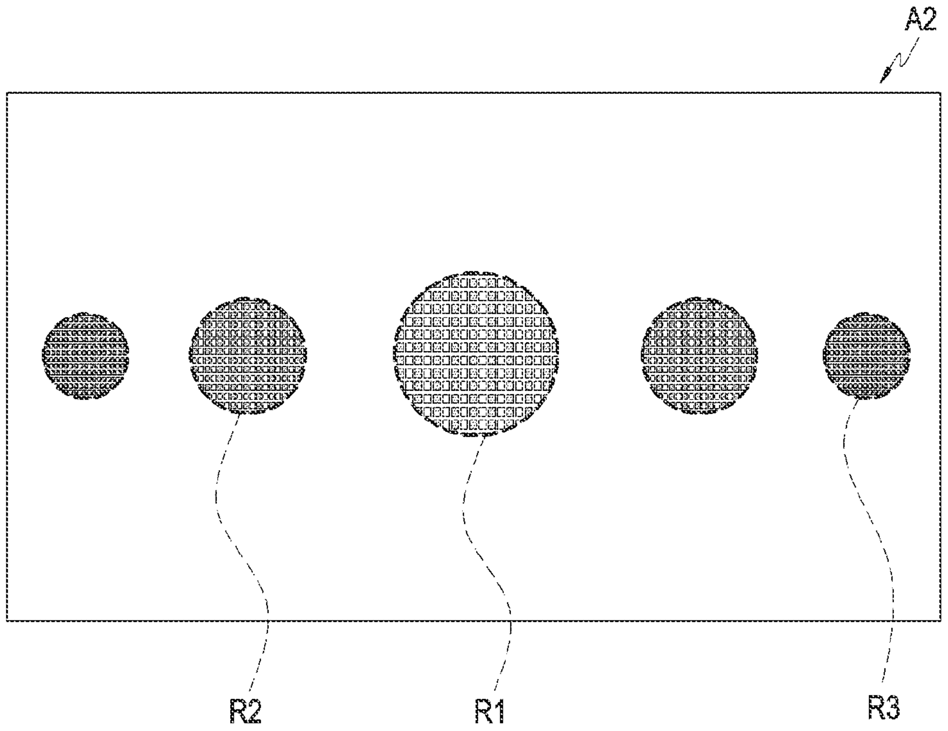
FIG. 7 is a diagram illustrating a light source area in a lighting unit of an electronic device or a lighting device, according to an embodiment.

FIG. 7 is a diagram illustrating a light source area in a lighting unit of an electronic device or a lighting device, according to an embodiment.

Referring to FIG. 7, the light sources (e.g., second light sources) are disposed in areas R1, R2, and R3 having designated shapes in the second light source area A2. The second light sources of the area denoted by "R1" may simulate the sun at noon, and the second light sources of the area denoted by "R3" may simulate the sun in a time zone after sunrise or before sunset. The electronic device and/or lighting device 100 may activate the second light sources in any one of the areas denoted by R1, R2, and R3 according to a user setting or information about a current time zone to provide lighting simulating the sun.

Figure 8:
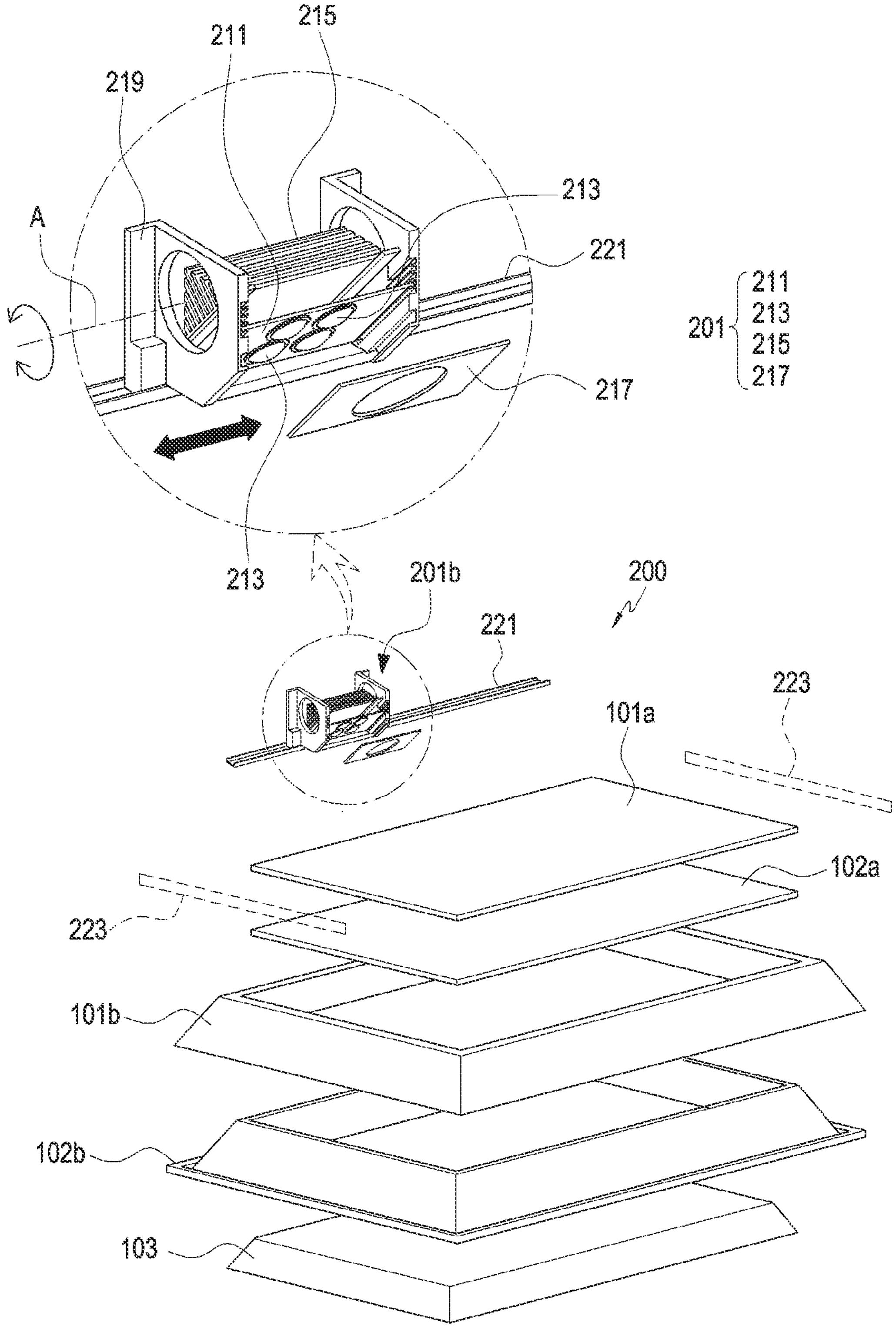
FIG. 8 is an exploded perspective view illustrating an electronic device or a lighting device, according to an embodiment.

FIG. 8 is an exploded perspective view illustrating an electronic device or lighting device, according to an embodiment.

In the embodiment illustrated in FIG. 8, the third lighting unit 201 simulating the sun is separated from the first lighting unit 101*a* and a lighting unit simulating the sky (e.g., the first lighting unit 101*a* and the second lighting unit 101*b*), the cover plate 102*a*, the bracket 102*b*, and/or the diffusion plate 103 may be similar to that of the preceding embodiment. Therefore, in this embodiment, a detailed description of the same or similar components in the preceding embodiment will be omitted, and the third lighting unit 201 will be described.

Referring to FIG. 8, the third lighting unit 201 simulating the sun may be provided on the first lighting unit 101*a* in the electronic device or lighting device 200. The third lighting unit 201 may be movably disposed on a plane (or curved surface) parallel to the first lighting unit 101*a*. The third lighting unit 201 may include a third substrate 211, third light sources 213 simulating the sun, and a heat radiation structure 215. The heat radiation structure 215 may include a plurality of heat radiation fins to provide a fairly large surface area compared to an actual volume, and allow heat generated in the process of outputting light from the third light sources 213 to be released to the outside through the heat radiation structure 215. In addition, the third lighting unit 201 may further include a lens unit 217 disposed in front of the third light sources 213 in a light radiation direction, and the lens unit 217 may adjust the angular range of light radiated from the third lighting unit 201.

The third lighting unit 201 may linearly move on the first lighting unit 101*a* in a direction parallel to the first lighting unit 101*a*. The electronic device or lighting device 200 may include a first linear motion guide 221 and a guide block 219 which is disposed on the bracket 102*b*. The guide block 219 may move along a first direction (e.g., a direction in which the first linear motion guide 221 extends) on the first lighting unit 101*a*, while being guided by the first linear motion guide 221. The third lighting unit 201 may be disposed on the guide block 219 and rotate around a rotation axis A. The third lighting unit 201 may adjust a direction in which an image or light simulating the sun is directed by rotating with respect to the guide block 219, while moving on the first lighting unit 101*a*.

The electronic device or lighting device 200 may further include a second linear motion guide 223, and the first linear motion guide 221 may move along a second direction (e.g., a direction in which the second linear motion guide 223 extends) intersecting the first direction, while being guided by the second linear motion guide 223. The third lighting unit 201 may move in the second direction together with the first linear motion guide 221, and/or in the first direction along the first linear motion guide 221, on a plane substantially parallel to the first lighting unit 101*a*. As the first linear motion guide 221 is combined with the second linear motion guide 223, a position of a sun image simulated by the third lighting unit 201 or a direction in which sunlight simulated by the third lighting unit 201 is directed may be implemented in various manners on a sky image simulated by the first lighting unit 101*a* and/or the second lighting unit 101*b*.

Figure 9:
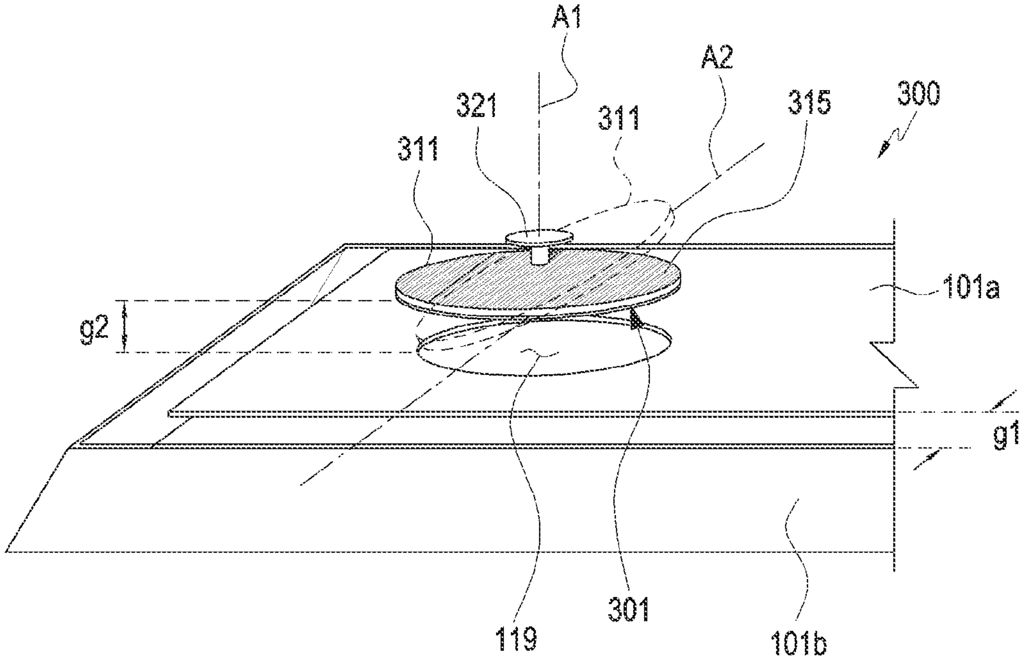
FIG. 9 is an exploded perspective view illustrating an electronic device or a lighting device, according to an embodiment.
Figure 10:
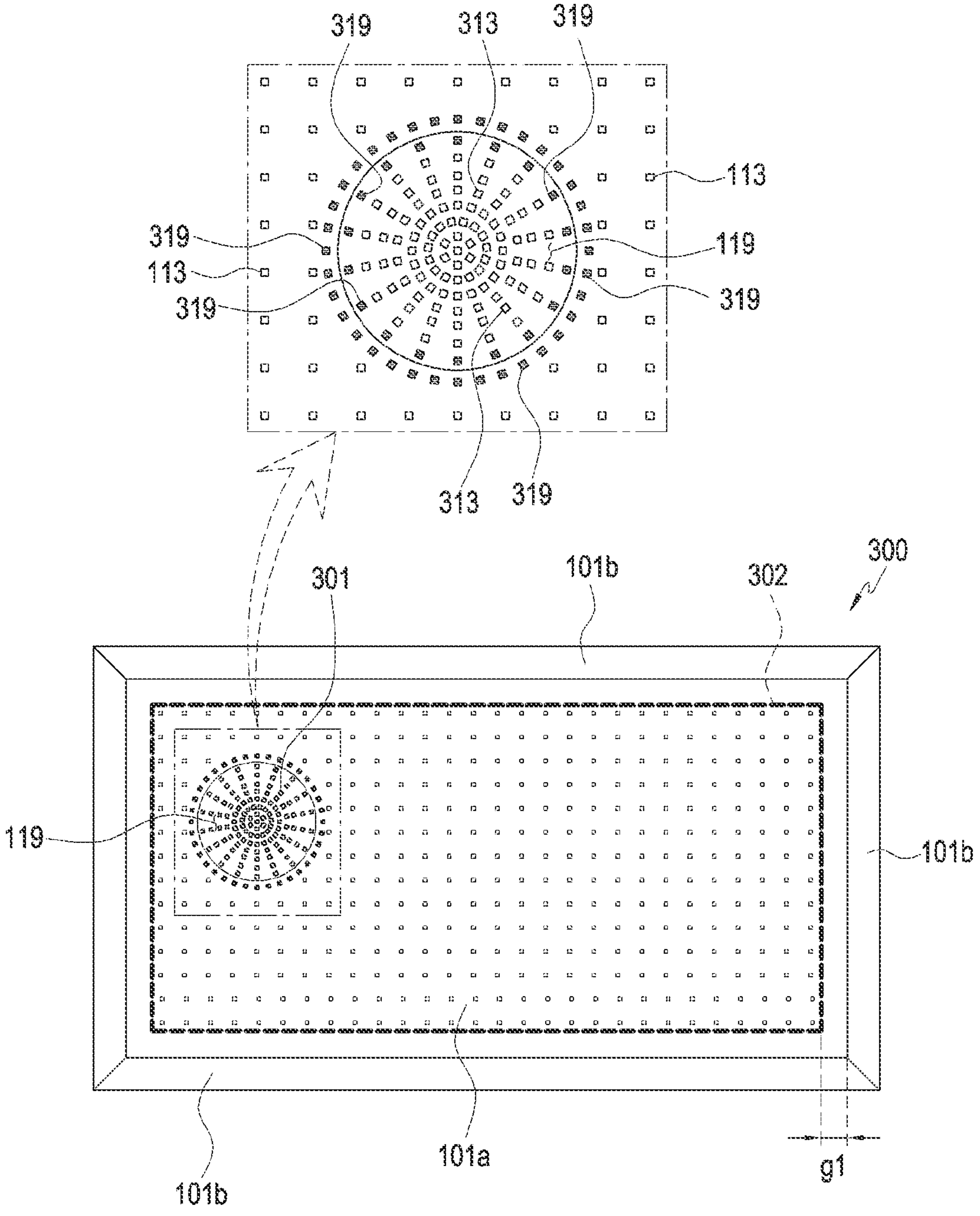
FIG. 10 is a plan view illustrating an electronic device or a lighting device, according to an embodiment.
Figure 11:
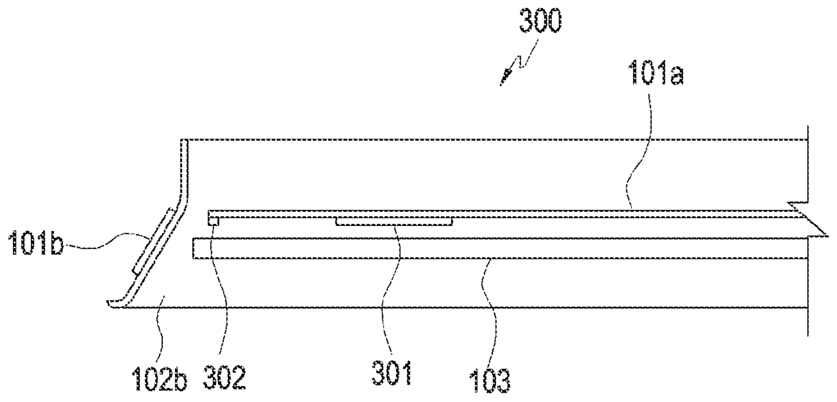
FIG. 11 is a sectional view illustrating an electronic device or a lighting device, according to an embodiment.

FIG. 9 is an exploded perspective view illustrating an electronic device or lighting device, according to an embodiment. FIG. 10 is a plan view illustrating the electronic device or lighting device, according to an embodiment. FIG. 11 is a sectional view illustrating the electronic device or lighting device, according to an embodiment.

A configuration in which the third lighting unit 301 is disposed above the first lighting unit 101*a* is exemplified in the embodiment of FIG. 11. Those skilled in the art will readily understand various arrangements of the third lighting unit 301 exist.

Referring to FIGS. 9-10, the third lighting unit 301 is disposed at a specified position. In FIG. 11, the third lighting unit 301 is disposed at a specified position above the first lighting unit 101*b*, and may adjust a direction of sunlight to be simulated by rotating around rotation axes A1 and A2. The electronic device or lighting device 300 may include a support bar 321 disposed above the first lighting unit 101*a*, and the third lighting unit 301 (e.g., including a third substrate 311 or a heat radiation structure 315) may be rotatably coupled with the support bar 321. The support bar 321 may be disposed inclined or perpendicular to the first lighting unit 101*a*, and may rotate above the first lighting unit 101*a* around a first rotation axis A1 defined in a length direction. The third lighting unit 301 may rotate on the support bar 321 around a second rotation axis A2 intersecting the first rotation axis A1. The third lighting unit 301 may radiate light in various directions above the first lighting unit 101*a*. The support bar 321 or the third lighting unit 301 may advance toward or recede from the first lighting unit 101*a*. A direction in which the third lighting unit 301 is directed or the distance (e.g., a second gap g2) between the third lighting unit 301 and the first lighting unit may be adjusted based on a user setting or information about a current time or real-time weather provided through an external electronic device or a network.

The third lighting unit 301 may be disposed above the first lighting unit 101*a*, directly facing the diffusion plate 103. While the support bar 321 of FIG. 9 is disposed in an opening 119, at least a part of the third lighting unit 301 may be disposed closer to the diffusion plate 103 than the first lighting unit 101*a*. The opening 119 may have a sufficient size to accommodate the third lighting unit 301, and the third lighting unit 301 may be at least partially disposed within the opening 119 during rotation around the first rotational axis A1 or the second rotational axis A2. In the structure illustrated in FIG. 11, as the third lighting unit 301 rotates around a second rotation axis A2, the third lighting unit 301 may be inclined with respect to the first lighting unit 101*a*, while a part of the third lighting unit 301 may be located closer to the diffusion plate 103 than the first lighting unit 101*a*, and another part thereof may be located farther from the diffusion plate 103 than the first lighting unit 101*a*.

The specified first gap g1 may be provided between the first lighting unit 101*a* and the second lighting unit 101*b* (and/or between the bracket 102*b* and the diffusion plate 103 in FIG. 8). For example, when the lighting device 300 is combined with another product such as an air conditioner, the lighting device 300 may provide a passage for an air flow by the first gap g1. In addition, the second gap g2 may be provided between the first lighting unit 101*a* and the third lighting unit 301. The third lighting unit 301 simulating the sun may emit light of a higher output than the first lighting unit 101*a* or the second lighting unit 101*b*, and may generate considerable heat during operation. The second gap g2 may form an air flow around the third lighting unit 301, so that heat generated by the third lighting unit 301 may be discharged into the air. The third lighting unit 301 may include third light sources 313 arranged on a curved surface or a flat surface (e.g., the third substrate 311). When the third light sources 313 are disposed on one surface of the third substrate 311, the third lighting unit 301 may include the heat radiation structure 315 (e.g., heat radiation fins) disposed on the other surface of the third substrate 311.

The first lighting unit 101*a* may be disposed between a diffusion plate 103 and the third lighting unit 301. In this case, the first lighting unit 101*a* may include the openings 119. The third lighting unit 301 may radiate light to a part of the diffusion plate 103 through the openings 119. The number, shape, or size of openings 119 may be appropriately selected in consideration of a motion (e.g., a linear motion as in the embodiment of FIG. 8) or rotation (e.g., a rotation around the first rotation axis A1 or the second rotation axis A2) of the third lighting unit 301.

When the third lighting unit 301 radiates light through the opening 119, the electronic device and/or lighting device 300 may further include fourth light sources 319. The fourth light sources 319 may be provided around the opening 119 on the first lighting unit 101*a*, and may further be provided at an edge of the third lighting unit 301. A visual sense of separation (e.g., an artificial boundary line image) may be generated between the images of the sky and the sun implemented on the diffusion plate 103. This sense of separation may be attributed to the difference in illuminance or color of light output from the first lighting unit 101*a* and the third lighting unit 301. The fourth light sources 319 may implement color hues that gradually change from a color implemented in the first lighting unit 101*a* to a color implemented in the third lighting unit 301 to overcome the visual sense of separation on the diffusion plate 103. It should be noted that for overcoming the visual sense of separation, the specifications or arrangements of the fourth light sources 319 may be combined in various manners, not limited to the embodiment illustrated in FIG. 10. For example, although a plurality of fourth light sources 319 are arranged along one circular trajectory on the first lighting unit 101*a* by way of example, more fourth light sources 319 may be arranged along two or more circular trajectories around the opening 119.

The electronic device and/or lighting device 300 may further include a fourth lighting unit 302. The fourth lighting unit 302 may provide line-type lighting, and may be disposed along an edge (or the periphery) of the first lighting unit 101*a* or along an edge (or the periphery) of a second lighting unit 101*b*. The fourth lighting unit 302 may include red, green, or blue light emitting diodes and realize various colors or visual effects. For example, the fourth lighting unit 302 may realize a sunset glow on the diffusion plate 103, adjust the chroma of a color on the diffusion plate 103, or execute a mood lamp function, in combination with the first lighting unit 101*a* or the second lighting unit 101*b*.

Figure 12:
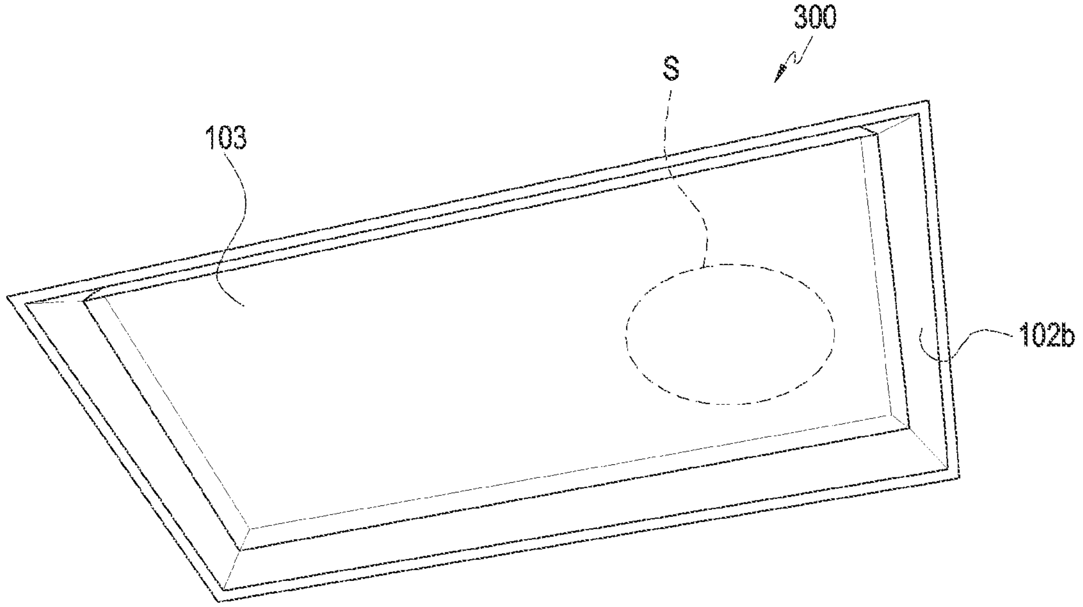
FIG. 12 is a perspective view illustrating an operation of an electronic device or a lighting device, according to an embodiment.

FIG. 12 is a perspective view illustrating an operation of an electronic device or a lighting device, according to an embodiment.

Referring to FIG. 12, an area of the diffusion plate 103, in which an image of the sun is simulated (hereinafter, referred to as "a sun simulation area S") may have a different illuminance and color from the other areas. In general, the sun simulation area S may be adjacent to an opening 119. As a third lighting unit 301 rotates, the position, size, or shape of the sun simulation area S may change. In some embodiments, when the sun is rendered as white in the sun simulation area S by the third lighting unit 301, a color realized on the diffusion plate 103 may change gradually from white to blue, at positions farther from the edge of the sun simulation area S. The gradual change in color may be implemented by the fourth light sources 319 of FIG. 10. A fourth light source unit 302 may output a red series color at a position close to the sun simulation area S, and output a blue series color or radiate no light at a position far from the sun simulation area S. For example, a simulated image of a sunset may be realized on the diffusion plate 103 by additionally using the fourth light source unit 302.

Figure 13:
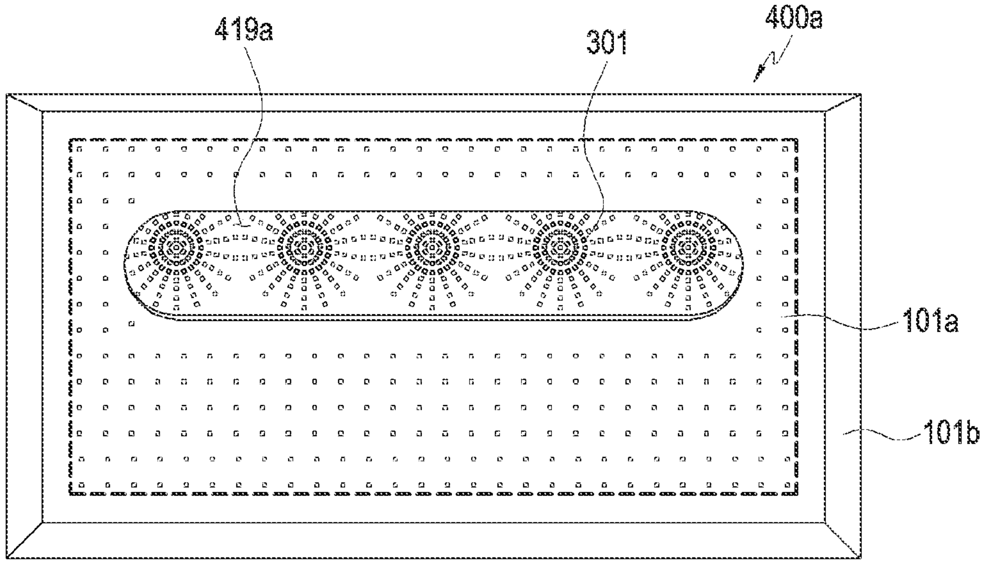
FIG. 13 is a perspective view illustrating a modification of an electronic device or a lighting device, according to an embodiment.
Figure 14:
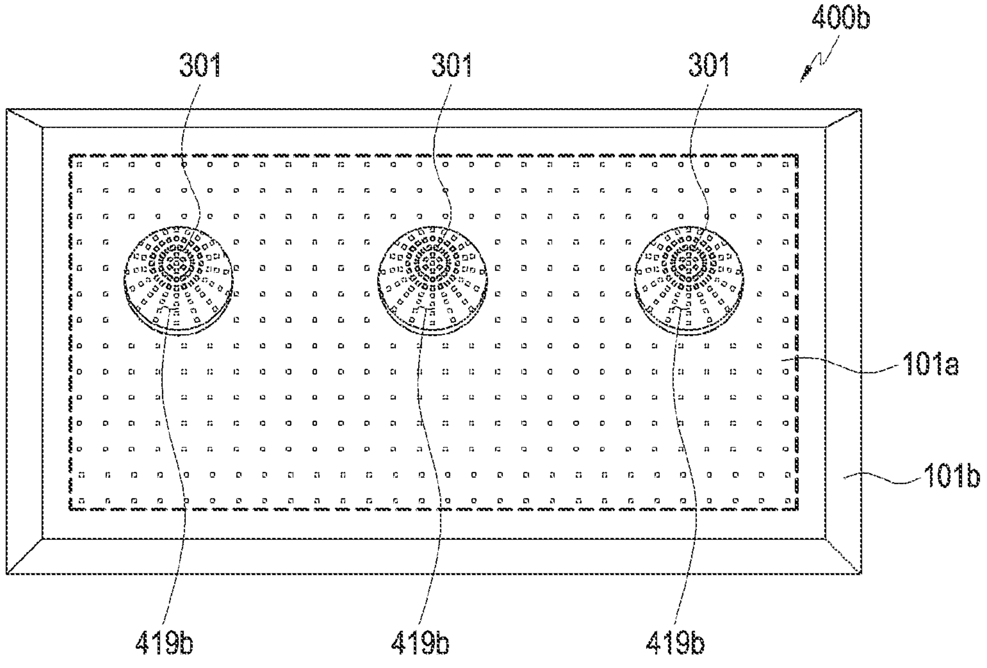
FIG. 14 is a perspective view illustrating a modification of an electronic device or a lighting device, according to an embodiment.

FIGS. 13-14 are perspective views illustrating various modifications of an electronic device or lighting device, according to various embodiments.

Referring to FIGS. 13 and 14, the shape or number of openings 419*a* and 419*b* provided in the first lighting unit 101*a* may vary. Opening 419*a* may include a plurality of openings and opening 419*b* may include a plurality of openings. That is, the term "opening" may include "one or more openings" or a "plurality of openings". In FIG. 13, the opening 419*a* may be an elongated hole extending along a specified trajectory. The opening 419*a* may be extended along a straight line trajectory, and the third lighting unit 301 may be disposed to correspond to the entire area of the opening 419*a*. The third lighting unit 301 may be shaped into a circular plate similar to the embodiment of FIG. 9 and disposed on the first lighting unit 101*a* along the extension trajectory of the opening 419*a* of FIG. 13, similar to the embodiment of FIG. 8. In FIG. 14, a plurality of openings 419*b* are provided, and each of a plurality of third lighting units 301 are disposed to correspond to any one of the openings 491*b*. In FIG. 14, for example, the embodiment of FIGS. 9, 10 and 11 may be referred to for the arrangement of the third lighting units 301.

Figure 15:
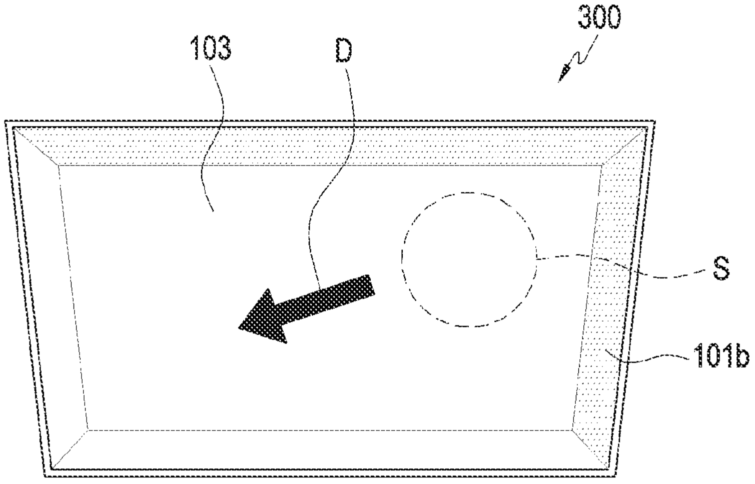
FIGS. 15, 16 and 17 are diagrams illustrating operations of an electronic device or a lighting device based on a direction in which a lighting unit is directed, according to various embodiments.
Figure 16:
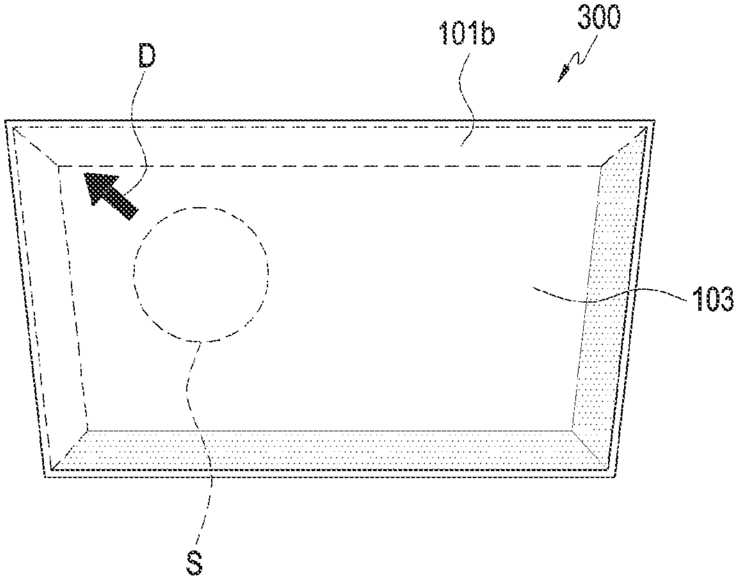
Figure 17:
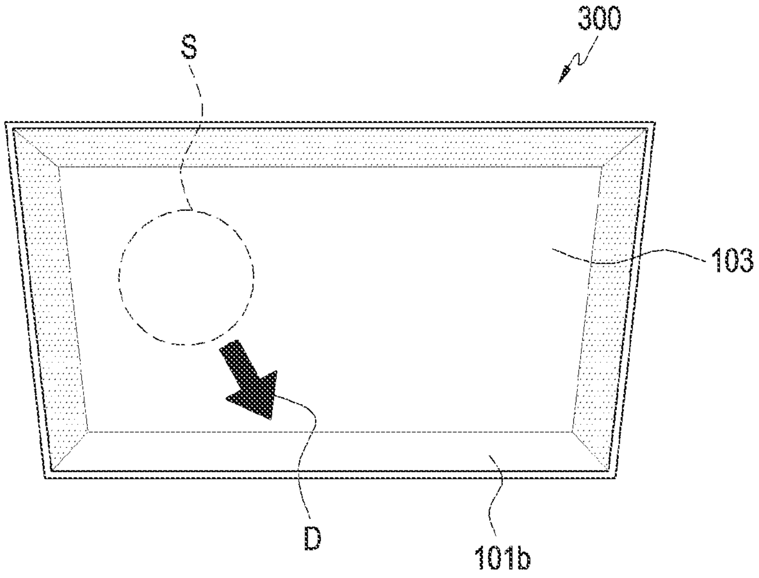

FIGS. 15-17 are diagrams illustrating exemplary operations according to directions in which a third lighting unit 301 is directed in the electronic device or lighting device 300, according to various embodiments.

Although reference numeral "101*b*" denoting the second lighting unit is shown in FIGS. 15-17, it is to be noted that the second lighting unit 101*b* may be visually hidden by the bracket 102*b* or the diffusion plate 103 in an actual installation environment. For example, light radiated from the second lighting unit 101*b* may realize lighting simulating the sky or a shadow at the edge of the diffusion plate 103 or on the bracket 102*b*.

Referring to FIGS. 15-17, depending on the position of the sun simulation area S, a second lighting unit 101*b* may simulate a direction D in which the sun shines or a direction of a shadow. For example, the second lighting unit 101*b* may realize lighting at a high illuminance or in the substantially same color as the color of the sky simulated on the diffusion plate 103 in the direction D or area where the simulated sun shines, and realize lighting at a low illuminance or lighting simulating a shadow in an opposite direction or area. The "direction D or area in which the simulated sun shines" may mean a part of the second lighting unit 101*b* located in the direction in which the third lighting unit 201 or 301 of FIG. 8 or 9 is directed. The second lighting unit 101*b* may simulate an area that sunlight reaches in the direction in which the third lighting unit is directed and a shadow area at a relatively low illuminance or chroma in an area in the opposite direction or in the remaining area.

As some of the light sources of the third lighting unit 301 (e.g., including the third light sources 313 in FIG. 10) in the opening 419*a* of FIG. 13 or the openings 419*b* of FIG. 14 simulate the sun, or as the third lighting unit 301 moves along the direction in which the opening 419*a* extends on the first lighting unit 101*a*, the position of the sun simulation area S may be appropriately selected. As such, the second lighting unit 101*b* may realize lighting at various illuminances or in various colors on the bracket 102*b* or at an edge of a diffusion plate (e.g., the diffusion plate 103 in FIG. 1 or FIG. 8) in conjunction with the third lighting unit 301. For example, the second lighting unit 101*b* in the electronic device and/or lighting device 300 may provide lighting at a high illuminance or high chroma to a position close to the simulated sun simulation area S or in the direction in which the third lighting unit 301 is directed in FIG. 9, and provide lighting at a relatively low illuminance or chroma in the opposite direction.

Figure 18:
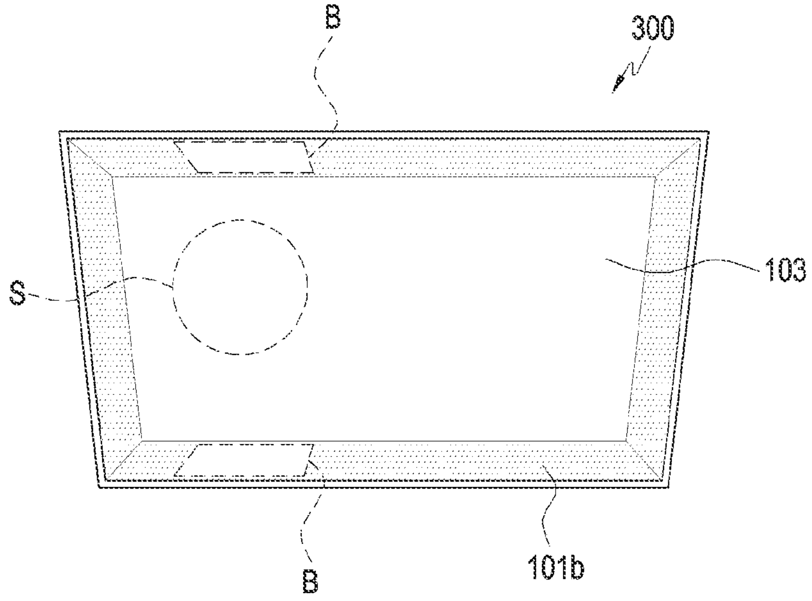
FIGS. 18 and 19 are diagrams illustrating operations of an electronic device or a lighting device based on movement of a lighting unit, according to various embodiments.
Figure 19:
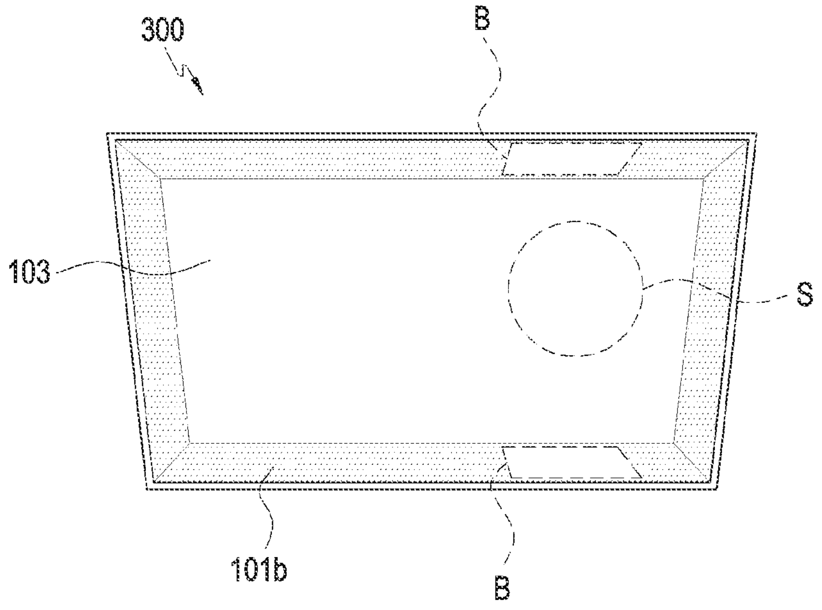

FIGS. 18-19 are diagrams illustrating various operation examples according to movement of the third lighting unit in the electronic device or lighting device, according to various embodiments.

Referring to FIGS. 18-19, the sun simulation area S may be moved to a specified position on the diffusion plate 103 according to current time information. When the sun simulation area S is moved, the second lighting unit 101*b* may realize lighting in a different color or at a different illuminance in some area (e.g., a second simulation area B) at a position parallel to the sun simulation area S. The second simulation area B may be configured in correspondence with the position or movement of the sun simulation area S, and the second lighting unit 101*b* may turn off the light sources or control the light sources to output light in a color different from that of the second simulation area B in the remaining area except for the second simulation area B.

The configuration of realizing a gradual color change at the boundary between lighting simulating the sun (e.g., the third lighting unit 301 in FIG. 9 or FIG. 10) and lighting simulating the sky (e.g., the first lighting unit 101*a* in FIG. 9 or FIG. 10) by using the fourth light sources has been described. Likewise, a gradual color change may be realized at the boundary between the sun simulation area S and the remaining area of the diffusion plate 103 or at the boundary between the second simulation area B and the remaining area of the second lighting unit 101*b*. This color change may be implemented by controlling light sources adjacent to the edge of the sun simulation area S or the second simulation area B. For example, lighting of a gradual change in illuminance or color may be provided at the edge of the sun simulation area S or the second simulating area B by applying different voltages or currents according to the positions of the light sources.

According to various embodiments, the lighting devices 100, 200, 300, 400*a*, and 400*b* as described above may be installed in an indoor space and provide lighting corresponding to an outdoor environment in sunrise, midday, and sunset time zones. For example, as lighting corresponding to current time information or current weather information is realized, an environment enabling a biorhythm to be maintained according to a timeline may be provided even indoors. This may be possible because each of the lighting devices 100, 200, 300, 400*a*, and 400*b* includes circuit devices such as a processor, a communication module, and/or a memory capable of performing communication with another electronic device (e.g., a smart phone) or a server. In some embodiments, a user may select an operation mode of the lighting device 100, 200, 300, 400*a*, or 400*b* by using a control panel provided as a part of the lighting device 100, 200, 300, 400*a*, or 400*b*, a remote controller, or a smart phone. Additionally, the lighting device 100, 200, 300, 400*a*, or 400*b* may provide lighting suitable for a user activity such as a wake-up mode, a sleep mode, a learning mode, a work mode, or an exercise mode according to user settings.

As described above, a lighting device may include a first lighting unit including a plurality of first light sources arranged on a first flat or curved surface, and configured to implement lighting of a first illuminance and of a first color, a second lighting unit including a plurality of second light sources arranged on a second flat or curved surface at least partially inclined with respect to the first lighting unit, disposed surrounding at least a part of the first lighting unit, and configured to implement lighting of a second illuminance at least partially different from the first illuminance and of a second color (e.g., lighting or an image that simulates the sky or a shadow), at least one opening formed to penetrate through the first lighting unit, and at least one third lighting unit including a plurality of third light sources arranged on a third flat or curved surface, and configured to implement lighting of a third illuminance higher than the first illuminance and of a third color through the at least one opening. The second lighting unit may be configured to implement the lighting of the second illuminance and the second color (e.g., lighting or an image that simulates a shadow) in conjunction with the third lighting unit.

The lighting device may further include fourth light sources arranged around the at least one opening on the first lighting unit or along an edge of the third lighting unit, and the fourth light sources may be configured to implement a gradual color change from the first color implemented by the first lighting unit to the third color implemented by the third lighting unit.

The lighting device may further include a diffusion plate disposed to face the first lighting unit, and the third lighting unit may be configured to radiate light to at least a part of the diffusion plate through the at least one opening.

The second lighting unit may be disposed apart from the diffusion plate by a specified gap.

The lighting device may further include a fourth lighting unit providing line-type lighting along an edge of the first lighting unit.

The lighting device may further include a support bar disposed to be perpendicular or inclined to the first lighting unit, and the third lighting unit may be rotatably coupled with the support bar.

The support bar may be configured to rotate on the first lighting unit around a first rotation axis defined in a length direction, and the third lighting unit may be configured to rotate with respect to the support bar around a second rotation axis intersecting the first rotation axis.

The support bar or the third lighting unit may be configured to advance toward the first lighting unit or recede away from the first lighting unit.

The third lighting unit may include a substrate having one surface (e.g., a first surface) on which the third light sources are arranged, and heat radiation fins arranged on the other surface (e.g., a second surface) of the substrate.

The at least one opening may be shaped into an elongated hole extending along a specified trajectory.

The third lighting unit may be configured to move along a direction in which the at least one opening extends.

The second lighting unit may be configured to provide lighting of a lower illuminance in an area in an opposite direction to a direction in which the third lighting unit is directed than in an area in the direction in which the third lighting unit is directed.

The lighting device may include a cover plate, a frame-shaped bracket providing an inclined surface with respect to the cover plate, a diffusion plate disposed surrounded at least partially by the bracket, a first lighting unit configured to implement the first color simulating the sky on the diffusion plate by radiating light through the cover plate, a second lighting unit configured to implement a shadow effect on the diffusion plate by radiating light through the bracket, at least one opening formed to penetrate through the first lighting unit, and at least one third lighting unit configured to implement the third color simulating the sun on the diffusion plate by radiating light through the at least one opening and the cover plate. The diffusion plate may be configured to transmit, reflect, refract, or scatter the light radiated from the first lighting unit, the second lighting unit, or the third lighting unit, and the second lighting unit may be configured to provide lighting of a selected part with a different illuminance or color from that of lighting of the other part in conjunction with the third lighting unit.

The second lighting unit may be configured to provide lighting of a lower illuminance in an area in an opposite direction to a direction in which the third lighting unit is directed than in an area in the direction in which the third lighting unit is directed.

The diffusion plate may be disposed apart from the bracket by a specified gap.

The lighting device may further include a support bar disposed to be perpendicular or inclined to the first lighting unit, and the third lighting unit may be rotatably coupled with the support bar.

The support bar may be configured to rotate on the first lighting unit around a first rotation axis defined in a length direction, and the third lighting unit may be configured to rotate with respect to the support bar around a second rotation axis intersecting the first rotation axis.

The third lighting unit may include a substrate having one surface (e.g., a first surface) on which the third light sources are arranged, and heat radiation fins arranged on the other surface of the substrate (e.g., a second surface).

The support bar or the third lighting unit may be configured to advance toward the first lighting unit or recede away from the first lighting unit.

The at least one opening may be shaped into an elongated hole extending along a specified trajectory, and the third lighting unit may be configured to move along a direction in which the at least one opening extends.

While specific embodiments have been described in the detailed description of the disclosure, it is apparent to those skilled in the art that many variations can be made without departing from the scope of the disclosure. For example, a lighting device according to an additional embodiment may be provided by combining different embodiments in the disclosure. For example, the linear movement structure of the third lighting unit 201 in FIG. 8 may be combined with the opening structure in FIG. 13 or FIG. 14. At least one of the embodiments of FIGS. 15, 16, 17, 18, and 19 may be further selectively combined with a configuration with the structures of FIGS. 8 and 13 (or FIG. 14) in combination.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. A lighting device comprising:

a first lighting unit including a plurality of first light sources arranged on a first flat or curved surface, and configured to implement lighting of a first illuminance and of a first color;

a second lighting unit including a plurality of second light sources arranged on a second flat or curved surface at least partially inclined with respect to the first lighting unit, the second lighting unit surrounding at least a part of the first lighting unit, and configured to implement lighting of a second illuminance at least partially different from the first illuminance and of a second color;

at least one opening formed to penetrate through the first lighting unit;

at least one third lighting unit including a plurality of third light sources arranged on a third flat or curved surface, and configured to implement lighting of a third illuminance higher than the first illuminance and of a third color through the at least one opening; and fourth light sources arranged around the at least one opening on the first lighting unit or along an edge of the third lighting unit, wherein the second lighting unit is configured to implement the lighting of the second illuminance and of the second color in conjunction with the third lighting unit, and wherein the fourth light sources are configured to implement a gradual color change from the first color implemented by the first lighting unit to the third color implemented by the third lighting unit.

2. The lighting device of claim 1, further comprising a diffusion plate disposed to face the first lighting unit, wherein the third lighting unit is configured to radiate light to at least a part of the diffusion plate through the at least one opening.

3. The lighting device of claim 2, wherein the second lighting unit is disposed apart from the diffusion plate by a specified gap.

4. The lighting device of claim 1, further comprising a fourth lighting unit providing line-type lighting along an edge of the first lighting unit.

5. The lighting device of claim 1, further comprising a support bar disposed to be perpendicular or inclined to the first lighting unit, wherein the third lighting unit is rotatably coupled with the support bar.

6. The lighting device of claim 5, wherein the support bar is configured to rotate on the first lighting unit around a first rotation axis defined in a length direction, and wherein the third lighting unit is configured to rotate with respect to the support bar around a second rotation axis intersecting the first rotation axis.

7. The lighting device of claim 5, wherein the support bar or the third lighting unit is configured to advance toward the first lighting unit or recede away from the first lighting unit.

8. The lighting device of claim 5, wherein the third lighting unit comprises:

a substrate having a first surface and a second surface, wherein the third light sources are arranged on the first surface of the substrate, and wherein heat radiation fins are arranged on the second surface of the substrate.

9. The lighting device of claim 1, wherein the at least one opening is shaped into an elongated hole extending along a specified trajectory.

10. The lighting device of claim 9, wherein the third lighting unit is configured to move along a direction in which the at least one opening extends.

11. The lighting device of claim 1, wherein the second lighting unit is configured to provide lighting of a lower illuminance in an area in an opposite direction to a direction in which the third lighting unit is directed than in an area in the direction in which the third lighting unit is directed.

12. The lighting device of claim 1, further comprising:

a cover plate;

a frame-shaped bracket providing an inclined surface with respect to the cover plate; and a diffusion plate surrounded at least partially by the bracket, wherein the first lighting unit is configured to implement the first color simulating the sky on the diffusion plate by radiating light through the cover plate, wherein the second lighting unit is configured to implement a shadow effect on the diffusion plate by radiating light through the bracket, wherein the third lighting unit is configured to implement the third color simulating the sun on the diffusion plate by radiating light through the at least one opening and the cover plate, and wherein the diffusion plate is configured to transmit, reflect, refract, or scatter the light radiated from the first lighting unit, the second lighting unit, or the third lighting unit.

13. The lighting device of claim 12, wherein the second lighting unit is configured to provide lighting of a lower illuminance in an area in an opposite direction to a direction in which the third lighting unit is directed than in an area in the direction in which the third lighting unit is directed.

14. The lighting device of claim 12, wherein the diffusion plate is disposed apart from the bracket by a specified gap.

15. The lighting device of claim 12, further comprising:

a support bar disposed to be perpendicular or inclined to the first lighting unit, wherein the third lighting unit is rotatably coupled with the support bar.

16. The lighting device of claim 15, wherein the support bar is configured to rotate on the first lighting unit around a first rotation axis defined in a length direction, and wherein the third lighting unit is configured to rotate with respect to the support bar around a second rotation axis intersecting the first rotation axis.

17. The lighting device of claim 12, wherein the third lighting unit includes a substrate having a first surface and a second surface, wherein the third light sources are arranged the first surface of the substrate, and wherein heat radiation fins are arranged on the second surface of the substrate.

18. The lighting device of claim 15, wherein the support bar or the third lighting unit is configured to advance toward the first lighting unit or recede away from the first lighting unit.

19. The lighting device of claim 12, wherein the at least one opening is shaped into an elongated hole extending along a specified trajectory, and wherein the third lighting unit is configured to move along a direction in which the at least one opening extends.

* * * * *